United States Patent [19]

Yamauchi et al.

[11] Patent Number: 5,012,360
[45] Date of Patent: Apr. 30, 1991

[54] DEHUMIDIFIER FOR MAGNETIC DISC APPARATUS

[75] Inventors: Shiro Yamauchi; Naotake Rito, both of Amagasaki, Japan

[73] Assignee: Mitsubishi Denki Kabushiki Kaisha, Tokyo, Japan

[21] Appl. No.: 268,235

[22] Filed: Nov. 7, 1988

[30] Foreign Application Priority Data

Jan. 19, 1988 [JP] Japan ............ 63-009968

[51] Int. Cl.⁵ .............................................. G11B 33/14
[52] U.S. Cl. ................... 360/97.02; 236/44 E
[58] Field of Search ............ 360/97.02; 236/44 E, 236/44 R; 209/129

[56] References Cited

U.S. PATENT DOCUMENTS

| 2,687,342 | 8/1954 | Strange et al. | 236/44 E |
| 3,056,935 | 10/1962 | Jensen | 236/44 E |
| 3,992,271 | 11/1976 | Danzig et al. | 204/129 |
| 4,039,409 | 8/1977 | La Conti et al. | 204/129 |
| 4,620,248 | 10/1986 | Gitzendanner | 360/97.02 |
| 4,831,475 | 5/1989 | Kakuda et al. | 360/97.03 |

FOREIGN PATENT DOCUMENTS

| 0038909 | 3/1977 | Japan | 360/97.02 |
| 60-36947 | 2/1985 | Japan . | |
| 60-114325 | 6/1985 | Japan . | |
| 61-216714 | 9/1986 | Japan . | |
| 61-00589 | 6/1987 | Japan . | |
| 0231488 | 10/1987 | Japan | 360/97.02 |
| 2198280 | 6/1988 | United Kingdom | 360/97.02 |

Primary Examiner—Robert S. Tupper
Assistant Examiner—Andrew L. Sniezek
Attorney, Agent, or Firm—Wolf, Greenfield & Sacks

[57] ABSTRACT

The present invention relates to a magnetic disc apparatus having a dehumidifying element for removing the moisture flowing from a vent into the apparatus, and the magnetic disc apparatus according to the present invention is provided with a dehumidifying element having a humidity controlling element comprising a hydrogen ion conductor and a pair of porous filmy electrodes which sandwich the conductor therebetween. Applying the voltage to the humidity controlling element, the moisture in the apparatus, after contacting the electrode provided on the central side of the apparatus, is supplied to a hydrogen ion conductor and electrolyzed. The hydrogen ions obtained by electrolysis move toward the electrode provided on the peripheral side of the apparatus, where at least either of the hydrogen or water is evolved to advance the dehumidification in the apparatus. Thus the magnetic disc apparatus according to the present invention is capable of resolving and removing stably the moisture in the apparatus and keeping a constant humidity in the apparatus irrespective of the humidity in the outside air.

20 Claims, 3 Drawing Sheets

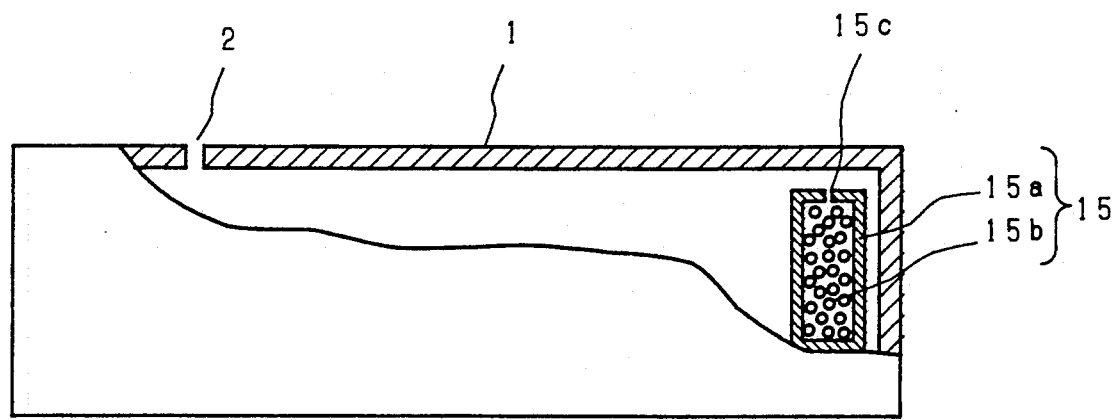
Fig. 2
Prior Art
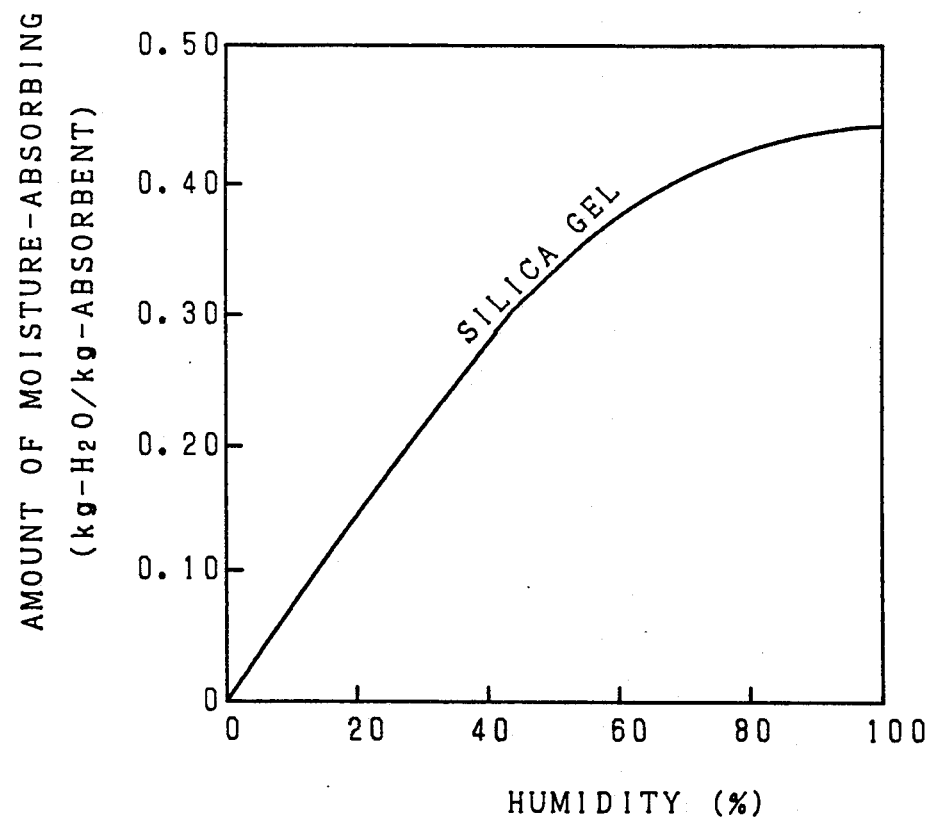

DEHUMIDIFIER FOR MAGNETIC DISC APPARATUS

BACKGROUND OF THE INVENTION

1. Field of the Invention

The present invention relates to a magnetic disc apparatus having a dehumidifying means for removing the moisture in the apparatus.

2. Description of the Prior Art

A conventional magnetic disc apparatus is shown in FIG. 1, in which the magnetic disc apparatus consists of a disc to be rotated, a head which is held in close vicinity to the recording surface of the disc, an actuator to let the head travel on the disc in the radial direction thereof and the like (none of them is shown in the drawings), installed in a container 1. At an appropriate position in the container 1, a vent 2 is provided for allowing the outside air to flow into the container 1, in order to temper the change in pressure in the container 1.

The moisture in the outside air, however, also flows into the container 1 from the vent 2, which results in an increase in the humidity in the container 1. And if the disc is made to stop rotating at such high humidities in the container 1 and the head is made to contact the disc, the head and the disc sometimes absorb each other to bring about troubles.

Therefore, in a conventional manner, the humidity in the container 1 is restrained from increasing by installing an absorber 15 in the container 1 which is an absorbent case 15a charged with a silica gel 15b, a siliceous absorbent, inside, for example, and by absorbing the moisture entering the container 1 with the silica gel 15b in the absorber 15. In this connection, the absorbent case 15a is provided with an opening 15c for regulating the absorbing speed, which controls the absorbing speed lest the humidity in the container 1 should excessively be low, while the moisture is absorbed by the silica gel 15b through the opening 15c. (See, for example, "The Tribology of Magnetic Records", a paper for the 46th. Meeting of the Applied Magnetics Society of Japan, a corporation aggregate, p. 17.)

The silica gel 15b, however is porous and the surface area per unit weight is very large, and while its amount of moisture-absorbing per unit weight will increase substantially in proportion to the increase in humidity as long as the structure of the silica gel 15b is kept gelatinous, as apparent from FIG. 2 showing the relationship between the amount of moisture-absorbing per unit weight and the humidity, the moisture-absorption by the silica gel 15b tends to be saturated when the humidity is high enough and the moisture-absorption by the silica gel 15b has sufficiently advanced to increase the moisture content in the silica gel 15b. (See, for example, "Kagaku Kohgaku Binran" [A Handbook of Chemical Engineering, in English], the 1978 revised 4th. edition, published by Maruzen Company Limited, p. 854.)

However, such a conventional apparatus has problems. For example, in the case where the moisture-absorption by the silica gel 15b in the absorber 15 has reached its saturation, the moisture in the container 1 cannot be absorbed by the silica gel 15b even when the humidity in the container 1 excessively increases. In addition, the amount of the moisture-absorption cannot be controlled on account of the size of the opening 15c for regulating the absorbing speed normally being fixed, which results in that it is not possible to control the humidity in the container 1 correspondingly to that in the outside air in such a case where the humidity in the outside air is very high and much moisture flows into the container 1 to bring about a slight insufficiency of the prevention of moisture in the container 1, for example.

SUMMARY OF THE INVENTION

The present invention has been made in order to solve aforementioned problems. The magnetic disc apparatus according to the present invention is provided with a dehumidifying means having a humidity controlling element comprising a hydrogen ion conductor and a pair of porous filmy electrodes which sandwich the conductor therebetween.

Consequently, the first object of the present invention is to provide a magnetic disc apparatus capable of resolving and removing stably the moisture in the apparatus.

The second object of the present invention is to provide a magnetic disc apparatus capable of maintaining the humidity in the apparatus at a stable condition without being affected by the humidity in the outside air.

Furthermore, according to the present invention, the dehumidifying means of such a construction as mentioned above is additionally provided with a moisture absorbent capable of carrying out respirations, namely, moisture absorption and evolution.

Therefore, the third object of the present invention is to provide a magnetic disc apparatus capable of supplying insufficiencies of dehumidification of the humidity controlling element by the moisture absorbent when the amount of the moisture flowing into the apparatus exceeds that to be resolved and removed by the humidity controlling element.

Yet the fourth object of the present invention is to provide a magnetic disc apparatus capable of carrying out dehumidifications in the apparatus by the moisture absorbent even when no voltage is applied to the humidity controlling element.

Moreover, the fifth object of the present invention is to provide a magnetic disc apparatus capable of controlling the humidity in the apparatus irrespective of whether or not any voltage is applied to the humidity controlling element and semipermanently, for both the moisture flowing into the apparatus and that evolved from the absorbent can be resolved and removed by means of the humidity controlling element in the apparatus according to the present invention.

The above and further objects and features of the invention will more fully be apparent from the following detailed description with accompanying drawings.

BRIEF DESCRIPTION OF THE DRAWINGS

FIG. 1 is a partially cutaway front view of a conventional magnetic disc apparatus;

FIG. 2 is a graph showing the relationship between the amount of moisture-absorbing of the silica gel and the humidity;

DESCRIPTION OF THE PREFERRED EMBODIMENTS

Figure 3:
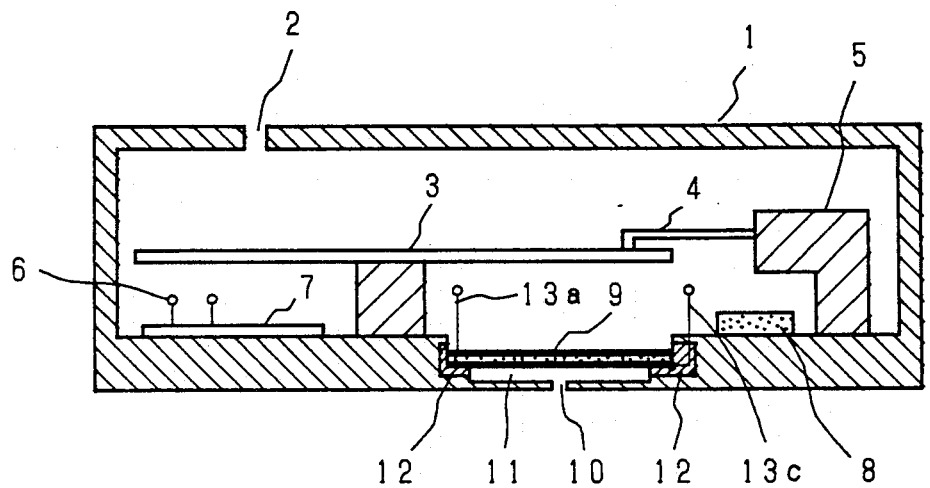
FIG. 3 is a schematic vertical section showing the magnetic disc apparatus according to the present invention.
Figure 4:
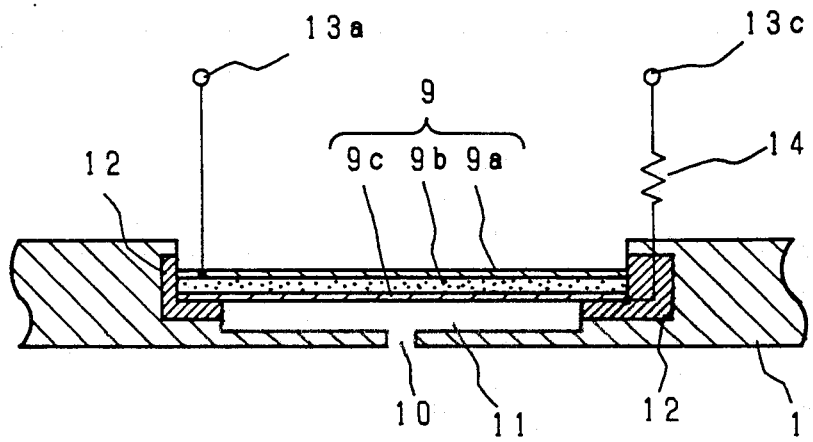
FIG. 4 is an enlarged schematic vertical section of the principal part shown in FIG. 3.

The present invention will be described with reference to the drawings showing the embodiments thereof. FIG. 3 is a schematic vertical section showing the magnetic disc apparatus according to the present invention, and FIG. 4 is an enlarged schematic vertical section showing a principal part thereof. As shown in the drawings, the magnetic disc apparatus consists of a disc 3 to be rotated, a head 4 which is held in close vicinity to the recording surface of the disc, an actuator 5 to let the head travel on the disc in the radial direction thereof and the like, installed in a container 1. At an appropriate position in the container 1 (at the top, for example), a vent 2 is provided for allowing the outside air, that is, the air, to enter in order to temper the change in pressure in the container 1.

At the bottom of the container 1 installed are a baseplate 7 wherein a power supply circuit 6 is incorporated that creates a 5-volt pressure and a moisture absorbent 8 made from polyvinyl alcohol and capable of carrying out respirations, namely, moisture absorption and evolution. At an appropriate position at the bottom of the container 1, a two-step concavity is formed. On the upper step of the concavity a humidity controlling element 9 is laid that is an integral three layers consisting of a hydrogen ion conductor 9b of a solid polyelectrolyte, a first electrode 9a and a second electrode 9c, both being of porous filmy platinum, forming a pair and sandwiching the conductor therebetween. At the central portion of the lower step of the concavity an opening 10 for dehumidification is formed, which provides a buffer space 11 communicating with the outside air through the opening 10 for dehumidification below the humidity controlling element 9. In this connection, an insulating member 12 is interposed between the humidity controlling element 9 and the container 1 for the purpose of insulating each other.

Terminals 13a and 13c are respectively led from both electrodes 9a and 9c of the humidity controlling element 9. The humidity controlling element 9 is connected to the power supply circuit 6 through the terminals 13a and 13c. A resistor 14 is provided on the terminal 13c at a part thereof which is led from the second electrode 9c of the two electrodes 9a and 9c.

In the apparatus according to the present invention of such a construction as mentioned above, the moisture in the outside air flows into the container 1 through the vent 2 when the humidity in the outside air (the air outside the container 1) is higher than that in the container 1. The moisture is absorbed by the absorbent 8, while it is resolved and removed also by means of the humidity controlling element 9 when the power supply circuit 6 is on. In the following part, explanations will be given in detail about the mechanism of resolving and removing the moisture according to the present invention.

Of both electrodes 9a and 9c of the humidity controlling element 9, the first electrode 9a contacts the air in the container 1, while the second electrode 9c contacts the outside air through the buffer space 11 and the opening 10 for dehumidification. Between both the electrodes 9a and 9c the direct current voltage is applied from the power supply circuit 6 through the terminals 13a and 13c of the humidity controlling element. The direct current voltage is applied in such way that the first electrode 9a is the anode and the second electrode 9c is the cathode. Applying the direct current voltage between both electrodes 9a and 9c in this way, such a reaction as will be shown by the following formula (1) advances on the interfacial layer between the first electrode 9a and the hydrogen ion conductor 9b.

$$H_2O \rightarrow 2H^+ + \tfrac{1}{2}O_2 + 2e^- \tag{1}$$

That is, the moisture contained in the air in the container 1 is electrolyzed, the hydrogen ions moving toward the second electrode 9c which is the cathode, the oxygen molecules staying in the space in the container 1 and the electrons that are negative charges shifting to the first electrode 9a which is the anode. Then, the hydrogen ions reaching the interfacial layer between the hydrogen ion conductor 9b and the second electrode 9c, reactions as will be shown by the following formulae (2) and (3) advance.

$$2H^+ + \tfrac{1}{2}O_2 + 2e^- \rightarrow H_2O \tag{2}$$

$$2H^+ + 2e^- \rightarrow H_2 \tag{3}$$

Figure 5:
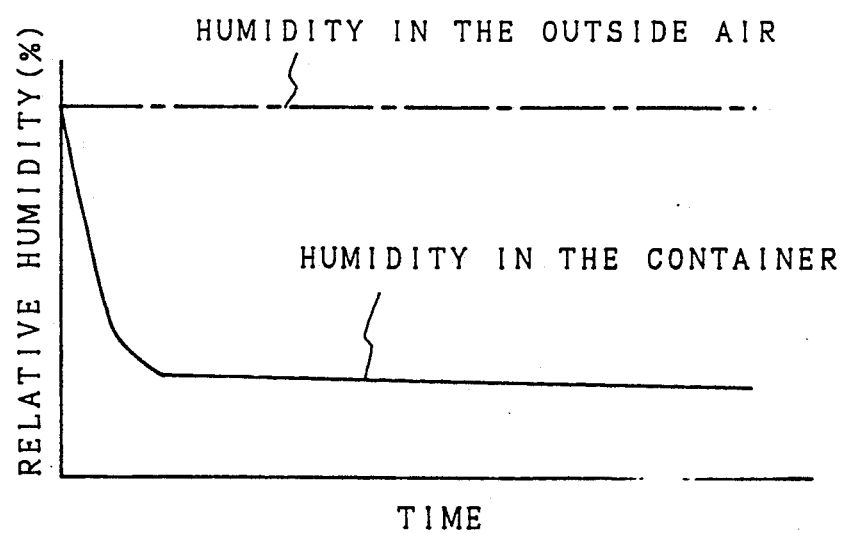
FIG. 5 is a graph showing a change in lapse of time of the humidity in the apparatus when dehumidifications have been carried out in the apparatus by the magnetic disc apparatus according to the present invention.

To go into detail, the reactions shown by the formulae (2) and (3) advance in the case where the supplying speed of the hydrogen ions to be supplied from the hydrogen ion conductor 9b to the second electrode 9c exceeds that of the oxygen to be supplied from the outside air to the second electrode 9c to generate water and the hydrogen, while the reaction shown by the formula (1) advances in the case where the supplying speed of the hydrogen ions is lower than that of the oxygen to generate water. Therefore, the humidity in the magnetic disc apparatus 1 initially equals, as apparent from FIG. 5 showing a change thereof in lapse of time to the humidity in the outside air (shown by a one-dotted chain line in the drawing). However, as the dehumidification advances with lapse of time, the moisture in the air flowing into the container 1 through the vent 2, that evolved from the inside of the container 1 to the outside air through the opening 10 for dehumidification by the humidity controlling element 9 and that absorbed or evolved in the container 1 by the moisture absorbent 8 come to keep balance by and by, which brings about a condition where the inside of the container 1 is kept dehumidified at a fixed humidity.

Moreover, the moisture absorbent 8 carries out absorbing operations when the amount of the moisture flowing into the container 1 through the vent 2 exceeds that to be resolved and removed by the humidity controlling element 9, while it carries out evolving operations when the amount of the moisture flowing into the container 1 through the vent 2 is smaller than that to be resolved and removed by the humidity controlling element 9. Therefore, it leads to the fact that when the power supply circuit 6 is off, for example, and no resolving and removing operations of the water are carried out by the humidity controlling element 9, the dehumidification in the container 1 is performed by the absorbing operations by the moisture absorbent 8. Furthermore, when the power supply circuit 6 is on, both the moisture flowing into the container 1 and that evolved from the moisture absorbent 8 are resolved and removed by the humidity controlling element 9.

The hydrogen ion conductor 9b is of a solid polyelectrolyte and has itself the property of absorbing the moisture, so it partially performs the same function as that of the moisture absorbent 8.

Moreover, when the humidity in the outside air is remarkably higher in comparison to that in the container 1, there is a danger that the water outside the container 1 may pass through the hydrogen ion conductor 9b through the opening 10 for dehumidification and flow into the container 1. It, however, is possible to keep the moisture from flowing into the container 1 by forming the ventilation sectional area of the opening 10 for dehumidification to be remarkably smaller than the area of the surface where the second electrode 9c contacts the outside air.

The reason why the resistor 14 is provided on the terminal 13c at a part thereof is that the existence of the resistor 14 makes it possible to maintain the upper limit value of the electric current passing through the lead between both electrodes 9a and 9c constant when the voltage of the power supply circuit 6 is constant.

Contrary to the above-mentioned embodiment, applying the voltage so that the first electrode 9a may be the cathode and the second electrode 9c the anode, the electrode reaction advances to carry out the humidification in the container 1. When humidifying the inside of the container 1 is needed, the humidification to be performed in this way can be made use of.

In the above-mentioned embodiment, the hydrogen ion conductor 9b, one of the components of the humidity controlling element 9, is of a solid polyelectrolyte. However, the hydrogen ion conductor may be of an inorganic compound, for example, a $\beta$-alumina substitution compound.

Also in the above-mentioned embodiment, explanations have been given on the assumption that the outside air would be the air. Instead, the outside air may be substituted by any one of such gases as oxygen, nitrogen, water vapor, hydrogen, helium, argon and the like, or mixed gases of not less than two of them. In the case where the outside air is a gas not including the oxygen, the hydrogen ions to be supplied from the hydrogen ion conductor 9b to the second electrode 9c bring about only the hydrogen-generating reaction as shown by the formula (3) on the interfacial layer between the hydrogen ion conductor 9b and the second electrode 9c.

Furthermore, the power supply circuit 6 may be substituted by a primary battery or a secondary battery having a fixed voltage, while the moisture absorbent 8 is not limited to that of polyvinyl alcohol and may be substituted by a high molecular moisture absorbent of a polyacrylic amide, for example, or the like.

All the explanations given above are on the apparatus wherein the moisture-absorbing means is provided with the moisture absorbent 8. Other embodiments, however, are possible wherein the moisture absorbent 8 is not provided.

Also explanations have been given as to the construction wherein the power supply circuit 6 is incorporated in the container 1. However, another construction will be all right wherein the power supply circuit is provided outside the container 1 and the voltage is applied to the humidity controlling element 9 from outside.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. In a magnetic disc apparatus comprising housing providing an enclosure for a magnetic disc, a disc drive means for rotating said magnetic disc, a magnetic transducer head, and an actuator for positioning the magnetic transducer head over the magnetic disc, said housing having at least one vent aperture extending therethrough, dehumidifying means disposed within the enclosure, for removing excess moisture that passes through the vent into the enclosure, said dehumidifying means comprising a hydrogen ion conductor disposed intermediate a pair of porous electrodes located adjacent said at least one vent aperture and a reversible moisture absorbent capable of carrying out respiration of moisture absorption and evolution, and which cooperates with said hydrogen ion conductor disposed intermediate said pair of porous electrodes to insure that the enclosure of the magnetic disc apparatus maintains a dehumidified atmosphere.

2. In a magnetic disc apparatus as set forth in claim 1, wherein said dehumidifying means further comprises a power supply circuit for applying a voltage to said electrodes.

3. In a magnetic disc apparatus as set forth in claim 1, wherein said hydrogen ion conductor is a solid polyelectrolyte.

4. In a magnetic disc apparatus as set forth in claim 1, wherein said hydrogen ion conductor is an inorganic compound.

5. In a magnetic disc apparatus as set forth in claim 4, wherein said inorganic compound is a $\beta$-alumina substitution compound.

6. In a magnetic disc apparatus as set forth in claim 1, wherein said porous electrodes are of porous platinum.

7. In a magnetic disc apparatus as set forth in claim 2, wherein a resistor is coupled to one of said electrodes and said power supply circuit.

8. In a magnetic disc apparatus as set forth in claim 1, wherein said moisture absorbent is a high molecular moisture absorbent.

9. In a magnetic disc apparatus as set forth in claim 8, wherein said moisture absorbent is polyvinyl alcohol.

10. In a magnetic disc apparatus as set forth in claim 8, wherein said high molecular moisture absorbent is a polyacrylic amide.

11. In a magnetic disc apparatus as set forth in claim 1, wherein, said dehumidifying means is positioned over said at least one vent aperture a first of said electrodes to the air outside the enclosure.

12. In a magnetic disc apparatus as set forth in claim 11, wherein a sectional area of said second vent aperture is smaller than the surface area of said first electrode communicating with the outside air.

13. In a magnetic disc apparatus as set forth in claim 11, wherein a voltage is applied to said electrodes so that said first electrode communicating with the outside air is a cathode, and said other electrode is an anode.

14. In a magnetic disc apparatus as set forth in claim 11, wherein a voltage is applied to said electrodes so that said first electrode communicating with the outside air is an anode and said other electrode is a cathode.

15. In a magnetic disc apparatus as set forth in claim 1, wherein said reversible moisture absorbent has absorption and evolution states, in said evolution state any moisture evolving therefrom being transferred via said hydrogen ion conductor to outside of said enclosure.

16. In combination, a magnetic disc apparatus and a dehumidifying means for removing moisture from said apparatus, said magnetic disc apparatus including a magnetic disc, means for rotating the disc, and a magnetic transducer head positioned adjacent the magnetic disc, the housing having a vent aperture for enabling air and moisture communication between the enclosure and an exterior thereof, said dehumidifying means comprising:

a humidity controlling element located adjacent said aperture;

means for selectively operating said humidity controlling element to control moisture transfer between said enclosure and outside thereof;

and reversible moisture absorbent means located within said housing for absorbing or evolving moisture;

said reversible moisture absorbent means absorbing moisture when the amount of moisture in the enclosure exceeds that which can be removed by the humidity controlling element;

said reversible moisture absorbent means evolving moisture when the level of moisture in the enclosure is less than that to be resolved and removed by the humidity controlling element.

17. The combination of claim 16 wherein said humidity control element when operated in conjunction with said reversible moisture absorbent means evolving moisture, said humidity controlling element transfers said moisture to outside of said enclosure to maintain a lower humidity within said enclosure.

18. The combination as set forth in claim 17 wherein said humidity controlling element comprises a hydrogen ion conductor disposed intermediate a pair of porous electrodes.

19. The combination as set forth in claim 18 wherein said means for selectively operating said humidity controlling element comprises a power supply circuit for applying a voltage to said electrodes.

20. In combination, a magnetic disc apparatus and a dehumidifying means for removing moisture from said apparatus, said magnetic disc apparatus including and a magnetic disc, means for rotating the disc, a magnetic transducer head positioned adjacent the magnetic disc, the housing having a vent aperture for enabling air and moisture communication between the enclosure and an exterior thereof, said dehumidifying means comprising:

a hydrogen ion conductor disposed intermediate a pair of porous electrodes and located adjacent said vent aperture;

and reversible moisture absorbent means located within said housing for absorbing or evolving moisture;

said reversible moisture absorbent means absorbing moisture when the amount of moisture in the enclosure exceeds that which can be removed by the hydrogen ion conductor;

said reversible moisture absorbent means evolving moisture when the level of moisture in the enclosure is less than that to be resolved and removed by the hydrogen ion conductor.

* * * * *